US008041935B2

(12) United States Patent
Yamada (10) Patent No.: US 8,041,935 B2
(45) Date of Patent: Oct. 18, 2011

(54) IMAGE FORMING APPARATUS REBOOT THAT ACCOUNTS FOR AUTOMATIC ADJUSTMENT PROCESSING

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1236 days.

(21) Appl. No.: 11/690,226

(22) Filed: Mar. 23, 2007

(65) Prior Publication Data
US 2009/0006833 A1 Jan. 1, 2009

(30) Foreign Application Priority Data
Mar. 27, 2006 (JP) ................................. 2006-084647

(51) Int. Cl.
*G06F 15/177* (2006.01)
(52) U.S. Cl. ............................. 713/2; 358/1.15; 358/504
(58) Field of Classification Search ................. 358/1.15, 358/504; 717/171; 713/2
See application file for complete search history.

(56) References Cited

U.S. PATENT DOCUMENTS

| 6,935,239 B2 | 8/2005 | Mizuno et al. | |
|---|---|---|---|
| 7,380,243 B2 * | 5/2008 | Sugishita et al. | ............. 717/168 |
| 2003/0231338 A1 * | 12/2003 | Haga | ........................... 358/1.15 |
| 2004/0260978 A1 | 12/2004 | Naito | |
| 2005/0179931 A1 | 8/2005 | Yamaguchi et al. | |
| 2007/0097449 A1 * | 5/2007 | Shibata | ......................... 358/406 |

FOREIGN PATENT DOCUMENTS

| JP | 6332734 | 12/1994 |
|---|---|---|
| JP | 9272232 | 10/1997 |
| JP | 2004-199503 A | 7/2004 |
| JP | 2004-276318 A | 10/2004 |
| JP | 2004334500 | 11/2004 |
| JP | 2004362414 | 12/2004 |
| JP | 2005219247 | 8/2005 |

OTHER PUBLICATIONS

JP Office Action dtd Jun. 2, 2009, JP Appln. 2006-084647.

* cited by examiner

*Primary Examiner* — Albert Wang
(74) *Attorney, Agent, or Firm* — Banner & Witcoff, Ltd (57) ABSTRACT

An image forming apparatus includes: a hardware resource used in image formation; and a storage unit storing a program for processing the image formation; and a controller that is operable to: accepting rebooting commands for rebooting the hardware resource and the program; monitoring a state of the hardware resource and a state of the program and detecting whether or not at least one of the hardware resource and the program is in automatic adjustment processing; and rebooting the hardware resource and the program according to the rebooting commands after completion of the automatic adjustment processing, when the rebooting commands are accepted in a state that the hardware resource or the program is in the automatic adjustment processing.

4 Claims, 10 Drawing Sheets

FIG. 10

IMAGE FORMING APPARATUS REBOOT THAT ACCOUNTS FOR AUTOMATIC ADJUSTMENT PROCESSING

CROSS-REFERENCE TO THE RELATED APPLICATION(S)

This application is based upon and claims priority from prior Japanese Patent Application No. 2006-084647 filed on Mar. 27, 2006, the entire contents of which are incorporated herein by reference.

TECHNICAL FIELD

Aspects of the present invention relate to an image forming apparatus having a hardware resource used in image formation and a program for processing the image formation.

BACKGROUND

A conventional technology is available that automatically carries out a rebooting when any failure resulting from hardware, a program or the like occurs. For example, the image forming apparatus described in JP-A-2005-219247 carries out an automatic rebooting when a rebooting detection portion detects a failure to be rebooted.

SUMMARY

However, the conventional image forming apparatus executes rebooting on detection of a failure to be rebooted by the rebooting detection portion, even when adjustment of concentration correction or registration is in progress. For example, when the rebooting is carried out during concentration correction, the concentration correction is discontinued halfway, which requires the concentration correction to resume from the beginning after the rebooting, thereby resulting in additional consumption of toner or ink. Further, for example, when rebooting is carried out while registration is made with respect to four units of photosensitive drums, the registration is required to resume from the beginning after the rebooting, thus resulting in additional time for returning an image forming apparatus to an image formable state.

Aspects of the present invention provide an image forming apparatus capable of preventing wasting time and consumables such as toner necessary for automatic adjustment processing in association with rebooting.

According to an aspect of the invention, there is provided an image forming apparatus including: a hardware resource used in image formation; and a storage unit storing a program for processing the image formation; and a controller that is operable to: accepting rebooting commands for rebooting the hardware resource and the program; monitoring a state of the hardware resource and a state of the program and detecting whether or not at least one of the hardware resource and the program is in automatic adjustment processing; and rebooting the hardware resource and the program according to the rebooting commands after completion of the automatic adjustment processing, when the rebooting commands are accepted in a state that the hardware resource or the program is in the automatic adjustment processing.

According to another aspect of the invention, there is provided an image forming apparatus, which is connected to an external apparatus via a network, including: a hardware resource used in image formation; and a storage unit storing a program for processing the image formation; and a controller that is operable to: receiving rebooting commands for rebooting the hardware resource and the program from the external apparatus via the network; inputting the rebooting commands for rebooting the hardware resource and the program; monitoring a state of the hardware resource and a state of the program and detecting whether or not at least one of the hardware resource and the program is in automatic adjustment processing; detecting whether the rebooting commands are received by the receiving or inputted by the inputting, when the rebooting commands are input in a state that the hardware resource or the program is detected in automatic adjustment processing; selecting whether the rebooting is executed after completion of the automatic adjustment processing or before completion of the automatic adjustment processing, when the rebooting commands are inputted by the inputting; and executing the rebooting depending on the result of the selecting.

According to another aspect of the invention, there is provided an image forming apparatus including: a hardware resource used in image formation; and a storage unit storing a program for processing the image formation; and a controller that is operable to accepting rebooting commands for rebooting the hardware resource and the program; monitoring a state of the hardware resource and a state of the program and detecting whether or not at least one of the hardware resource and the program is in automatic adjustment processing; and making the rebooting commands non-executable when the rebooting commands is accepted in a state that the hardware resource or the program is in automatic adjustment processing.

According to another aspect of the invention, there is provided a program for processing image formation using a hardware resource, the program being embodied on a computer readable medium and which, when executed by a computer, causes the computer to perform predetermined operations including: accepting rebooting commands for rebooting the hardware resource and the program; monitoring a state of the hardware resource and a state of the program and detecting whether or not at least one of the hardware resource and the program is in automatic adjustment processing; and rebooting the hardware resource and the program according to the rebooting commands after completion of the automatic adjustment processing, when the rebooting commands are accepted in a state that the hardware resource or the program is in the automatic adjustment processing.

According to another aspect of the invention, there is provided a program for processing image formation using a hardware resource, the program being embodied on a computer readable medium and which, when executed by a computer, causes the computer to perform predetermined operations including: receiving rebooting commands for rebooting the hardware resource and the program from an external apparatus via a network; inputting the rebooting commands for rebooting the hardware resource and the program; monitoring a state of the hardware resource and a state of the program and detecting whether or not at least one of the hardware resource and the program is in automatic adjustment processing; detecting whether the rebooting commands are received by the receiving or inputted by the inputting, when the rebooting commands are input in a state that the hardware resource or the program is detected in automatic adjustment processing; selecting whether the rebooting is executed after completion of the automatic adjustment processing or before completion of the automatic adjustment processing, when the rebooting commands are inputted by the inputting; and executing the rebooting depending on the result of the selecting.

According to another aspect of the invention, there is provided a program for processing image formation using a hardware resource, the program being embodied on a computer readable medium and which, when executed by a computer, causes the computer to perform predetermined operations including: accepting rebooting commands for rebooting the hardware resource and the program; monitoring a state of the hardware resource and a state of the program and detecting whether or not at least one of the hardware resource and the program is in automatic adjustment processing; and making the rebooting commands non-executable when the rebooting commands is accepted in a state that the hardware resource or the program is in automatic adjustment processing.

DETAILED DESCRIPTION OF THE ILLUSTRATIVE ASPECTS

Figure 1:
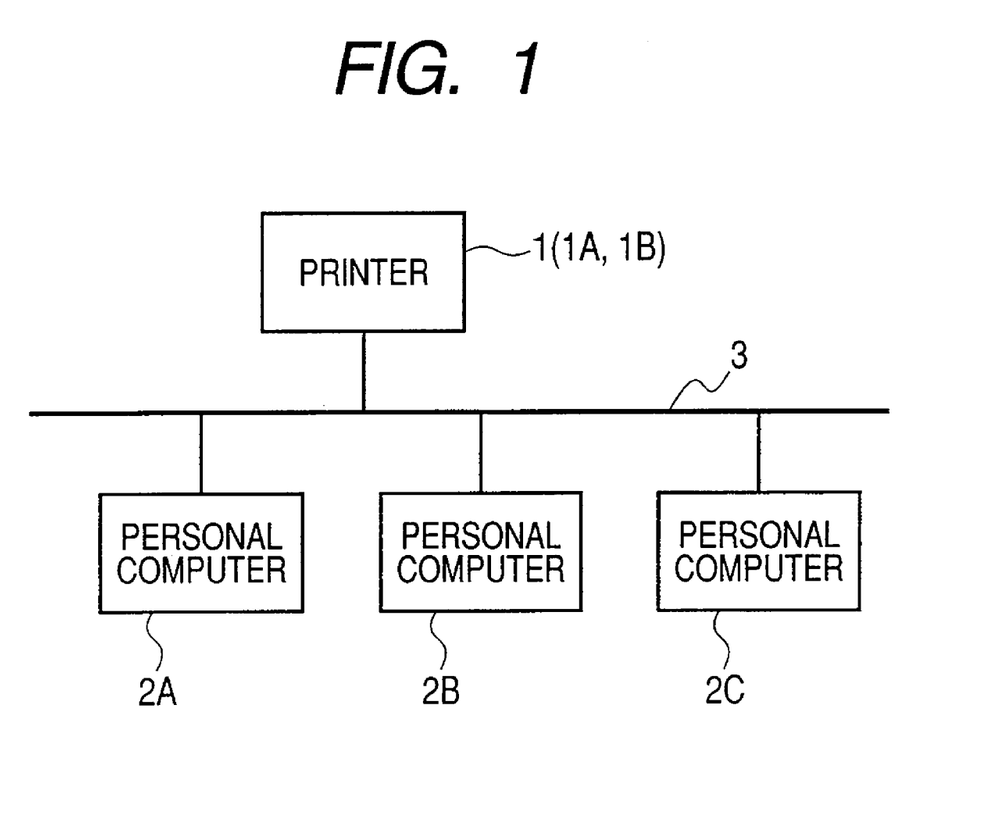
FIG. 1 is a conceptual diagram illustrating a system in which a personal computer is connected via a network to a printer of an exemplary aspect of the present invention.

Next, a description will be given of a first aspect of an image forming apparatus in the present invention by referring to the drawings. FIG. 1 is a conceptual diagram illustrating the configuration of a system in which a personal computer 2 is connected via a network 3 to a printer 1.

The printer 1 is connected with a plurality of personal computers 2A, 2B, 2C and others via the network 3 such as a LAN so as to be connected. In the following description, where the personal computers 2A, 2B, 2C or others are not required for differentiation, "personal computer 2" will be referred to representatively. The printer 1 is one example of an image forming apparatus for forming image data received from the personal computer 2 on recording paper 4 and provided with a network-type (web browser-type) management function so that the personal computers 2A, 2B, 2C and others can easily manage the printer 1, which is a common resource. The above-described printer 1 has a feature to control the execution of rebooting when rebooting commands are input in a state of detecting that a hardware resource or a program is in automatic adjustment processing.

Figure 2:
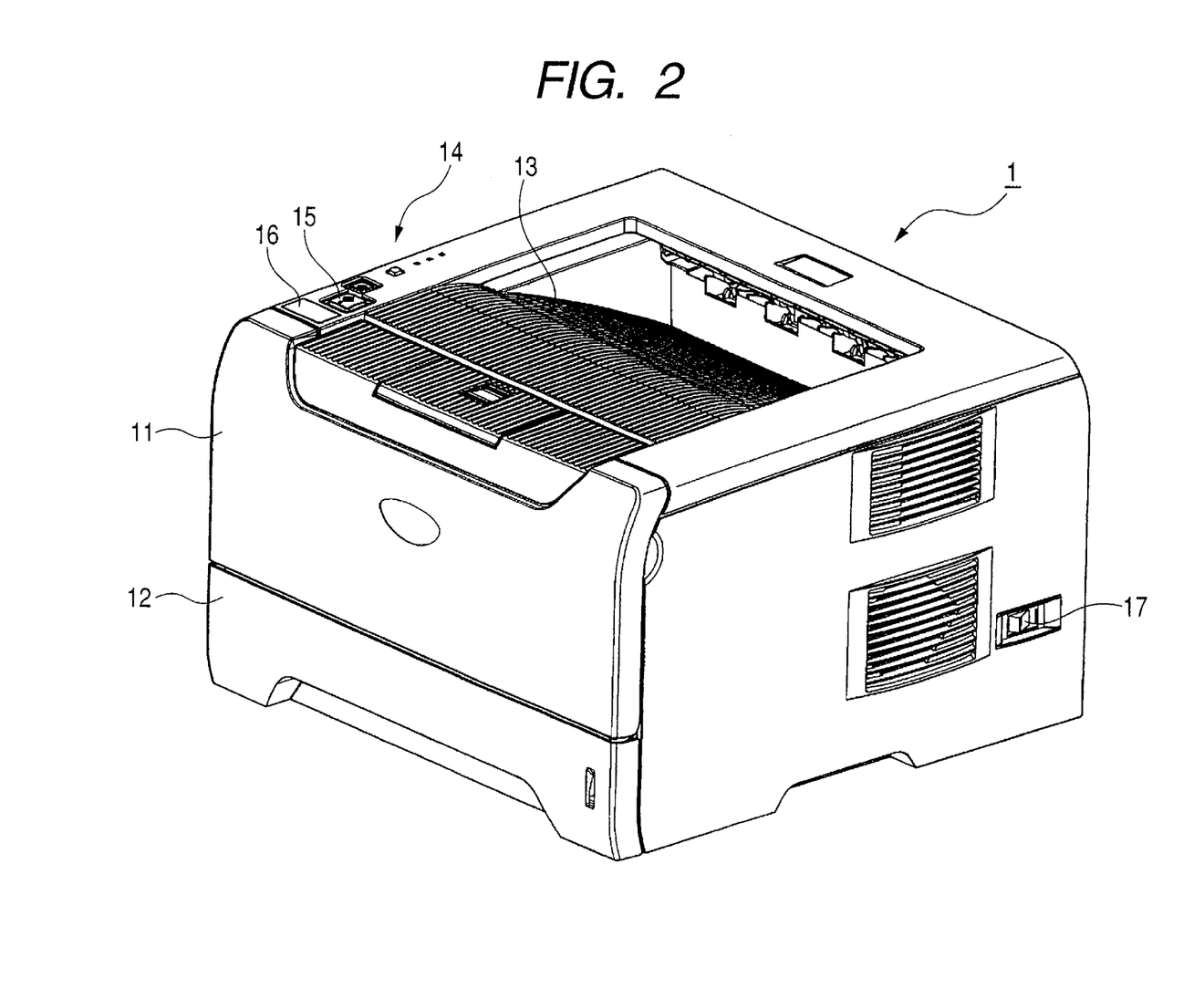
FIG. 2 is a perspective view illustrating an outer appearance of the printer shown in FIG. 1.

FIG. 2 is a perspective view illustrating an external appearance of the printer 1 shown in FIG. 1.

The printer 1 is constituted in the external appearance by a box-shaped main body casing 11. A paper feeding cassette 12 which accommodates recording paper 4 is provided below the main body casing 11 so as to be attached or detached from the front face. A paper discharging tray 13 is formed on the upper face of the main body casing 11, and an operation portion 14 is provided on one side of the paper discharging tray 13. The operation portion 14 operates the printer 1 and is provided with an operation button 15 for inputting operational instructions, a liquid crystal panel 16 for displaying information and the like. A power-on switch 17 for turning the printer 1 ON/OFF is provided on the side face of the main body casing 11.

Figure 3:
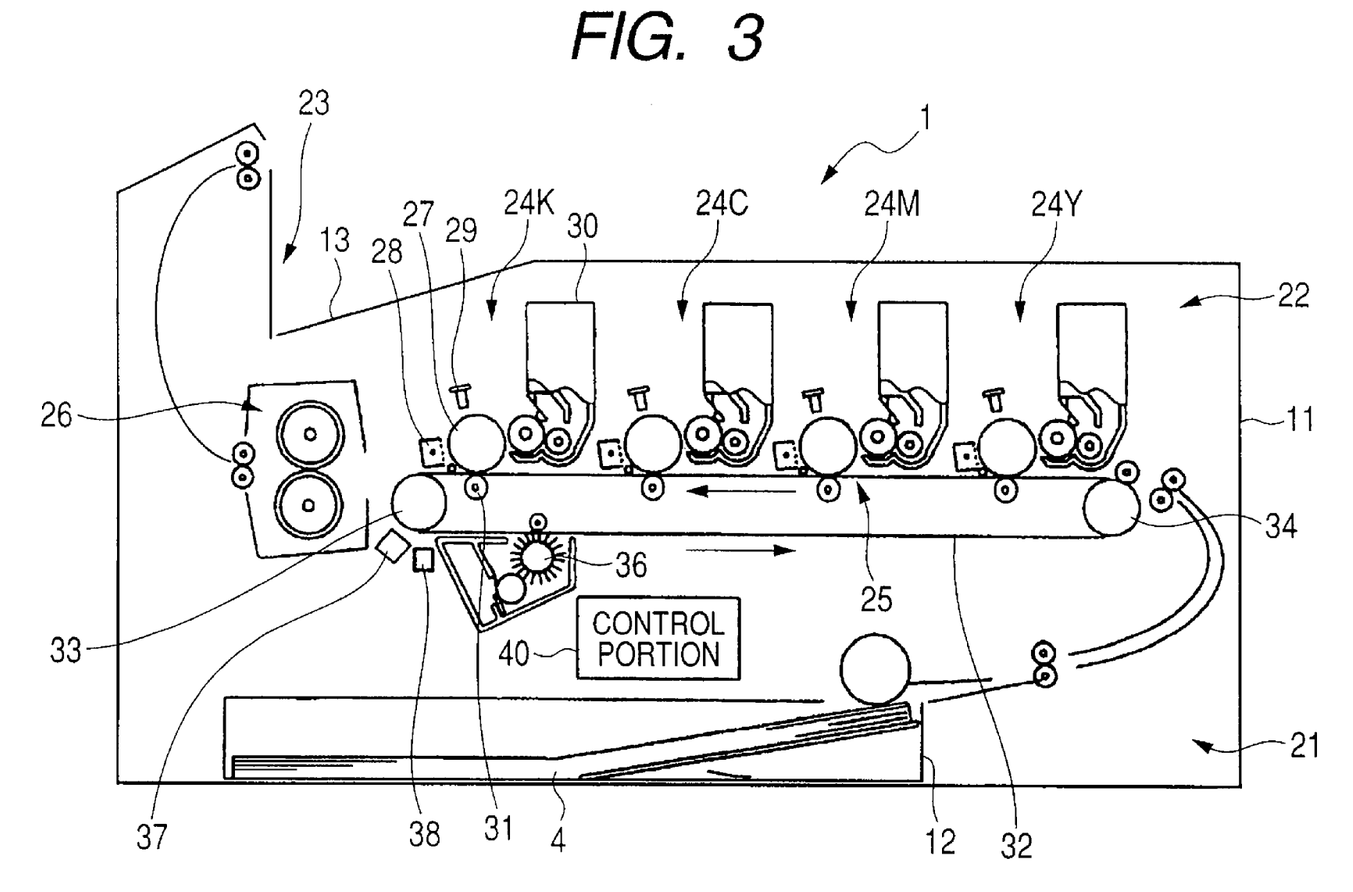
FIG. 3 is a view illustrating an internal constitution of the printer shown in FIG. 2.

FIG. 3 is a drawing illustrating an internal constitution of the printer 1 shown in FIG. 2.

In the printer 1, an image forming portion 22 forms an image on recording paper 4 picked up by a paper feeding portion 21 from a paper feeding cassette 12, and a paper discharging portion 23 discharges the recording paper 4 on which the image is formed to a paper discharging tray 13.

Image forming portion 22 is constituted with four image forming units, 24Y, 24M, 24C and 24K, a transfer portion 25 and a fixing portion 26. It is noted that in the following description, "image forming unit 24" is representatively referred to where the image forming units 24Y, 24M, 24C and 24K are not required for differentiation. Further, the image forming unit 24 constitutes a hardware resource of the present invention.

The image forming units, 24Y, 24M, 24C and 24K, respectively accommodate yellow (Y), magenta (M), cyan (C) and black (K) color toner and are arranged along a direction in which the recording paper 4 is conveyed.

The image forming unit 24 is constituted with a photosensitive drum 27 as an image retainer, an electrifier 28 for charging the photosensitive drum 27, an exposure unit 29 for forming an electrostatic latent image on the photosensitive drum 27, and a development unit 30 for forming a visible image by making toner adhere to the photosensitive drum 27 based on development bias applied to a space with the photosensitive drum 27. The development unit 30 accommodates toner of respective colors corresponding to the thus arranged image forming units, 24Y, 24M, 24C and 24K.

The image forming units, 24Y, 24M, 24C and 24K, are all the same in constitution. If symbols are given to constituents of all the image forming units 24 in FIG. 3, they will render the drawing difficult in viewing. Therefore, in FIG. 3, the symbols are given to the constituents of the image forming unit 24K alone, while specific labels for constituents of the other image forming units, 24Y, 24M and 24C are omitted.

The transfer portion 25 is constituted with a transfer roller 31, a conveyance belt 32, a conveyance belt driving roller 33 and a conveyance belt driven roller 34.

The conveyance belt 32 is wound around the conveyance belt driving roller 33 and the conveyance belt driven roller 34, and disposed inside the main body casing 11 in such a way that the outer face is opposed and in contact with the photosensitive drum 27 of each of the image forming units 24. The transfer roller 31 is arranged inside the conveyance belt 32 so as to be opposed to the photosensitive drum 27 across the conveyance belt 32. An appropriate transfer bias is applied to the transfer roller 31, when transferred.

The fixing portion 26 is disposed downstream from the conveyance belt driving roller 33.

Therefore, the image forming portion 22 transmits the driving force of the conveyance belt driving roller 33 to the conveyance belt 32, allowing the conveyance belt 32 to move counter-clockwise when viewed in the drawing, thereby, sequentially conveying recording paper 4 conveyed from the paper feeding portion 21 to the image forming portion 22, to a space between the photosensitive drums 27 of image forming units 24Y, 24M, 24C and 24K and the transfer roller 31 of the transfer portion 25 and transferring visible images of each color formed at the respective photosensitive drums 27, which are superimposed on the recording paper 4. Then, images transferred to the recording paper are heat-fixed at the fixing portion 26.

A toner collecting unit 36 is disposed below the conveyance belt 32, that is, downstream from the image forming unit 20K, in such a way as to be in contact with the conveyance belt 32. A concentration sensor 37 for measuring the concentration of a patch formed on concentration correction and a mark detector 38 for detecting a mark made on the conveyance belt 32 on registration are arranged outside the conveyance belt 32 or between the image forming unit 20K and the toner collecting unit 36.

Individual parts of the above constituted printer 1 are controlled by a control portion 40.

Figure 4:
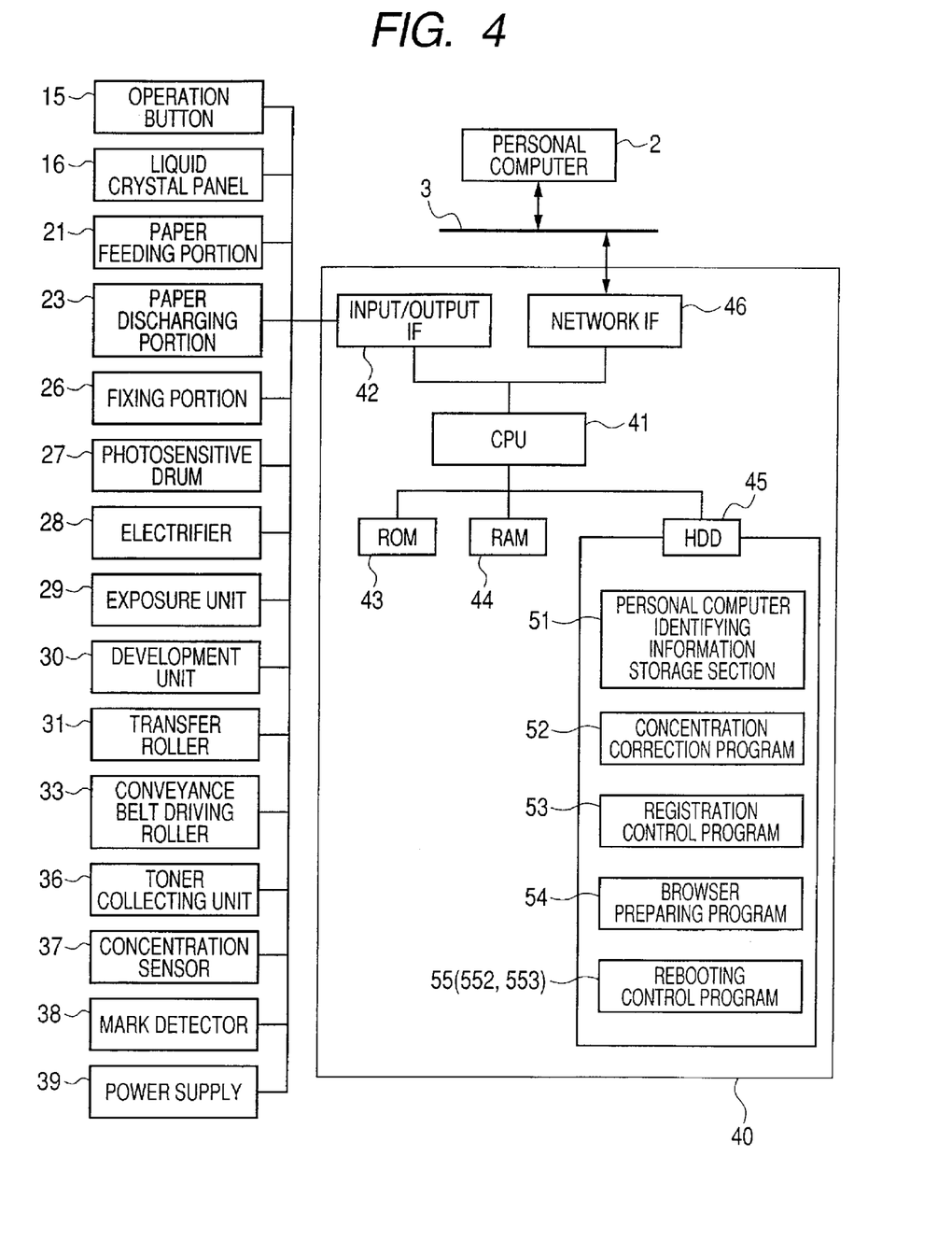
FIG. 4 is an electrical block diagram of the control portion shown in FIG. 2.

FIG. 4 is an electrical block diagram of the control portion 40 shown in FIG. 2.

The control portion 40 is a known computer which is constituted mainly with a CPU 41 in charge of processing and calculation of data. The CPU 41 is connected with an input/output interface (hereinafter, referred to as "input/output IF") 42, a ROM 43, a RAM 44, a hard-disk drive (hereinafter, referred to as "HDD") 45 and a network interface (hereinafter, referred to as "network IF") 46. The control portion 40 constitutes a hardware resource of the present invention.

The CPU 41 performs processing and calculating of data.

The input/output IF 42 is connected with the operation button 15, a liquid crystal panel 16, a paper feeding portion 21, a paper discharging portion 23, a fixing portion 26, a photosensitive drum 27, an electrifier 28, an exposure unit 29, a development unit 30, a transfer roller 31, a conveyance belt driving roller 33, a toner collecting unit 36, a concentration sensor 37, a mark detector 38, a power supply 39 and the like.

The ROM 43 is a read-only non-volatile memory and stores various data and programs. The RAM 44 is a readable/writable volatile memory and stores various data and programs.

Figure 5:
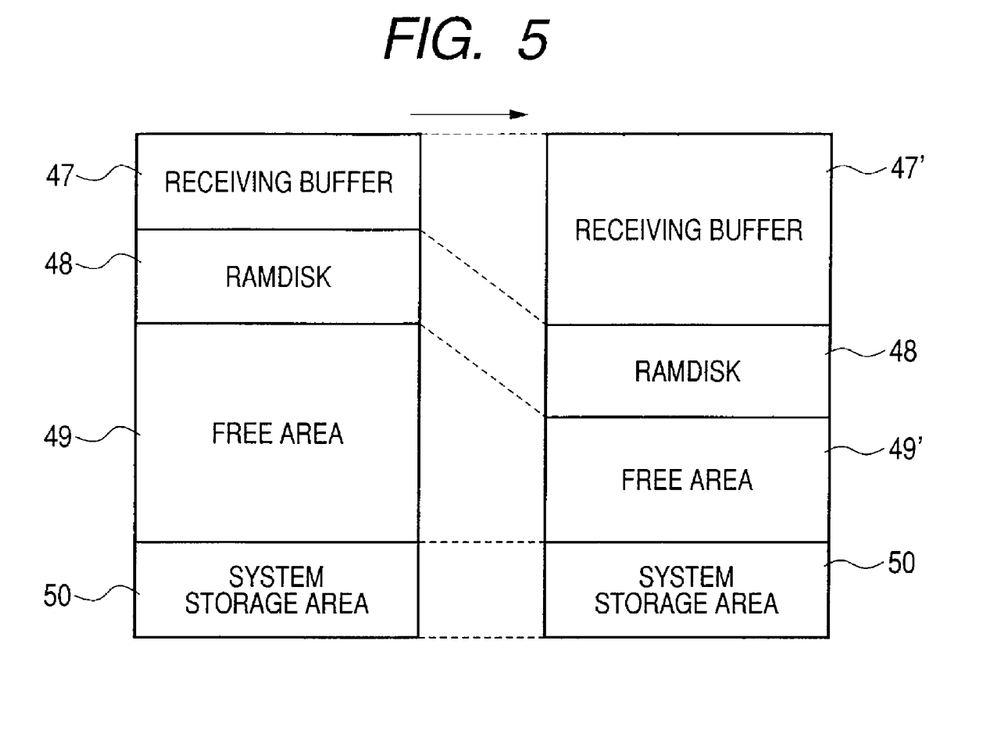
FIG. 5 is a conceptual diagram illustrating a constitution of the RAM shown in FIG. 4.

FIG. 5 illustrates an example of a configuration of the RAM shown in FIG. 4.

At the RAM 44, a receiving buffer 47, a RAM DISK 48, a free area 49 and a system storage area 50 are arranged. The arrangement of each of the areas, 47, 48, 49 and 50, can be changed in any way according to instructions from the personal computer 2 and those input from the operation button 15.

In this instance, the receiving buffer 47 is an area for temporarily storing data received by the printer 1. The receiving buffer 47 stores, for example, print data and rebooting commands.

The RAM DISK 48 is an area for storing data. The RAM DISK 48 is used to store print data, when secure print is executed for saving print data, for example, until a password is input. The free area 49 is an area for temporarily storing data and calculation results when the CPU 41 processes, calculates or analyzes data.

The system storage area 50 is an area for storing data related to system operation.

Figure 6:
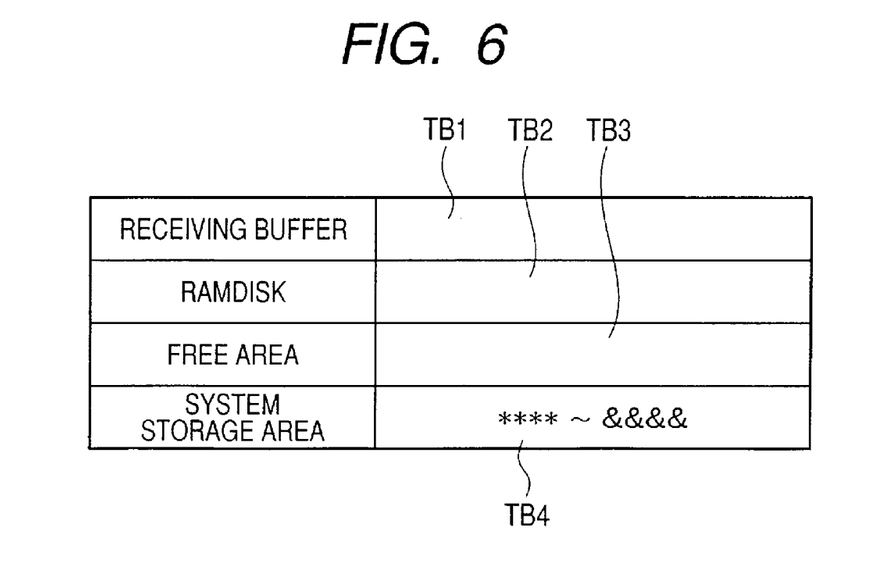
FIG. 6 is an example of an address table storing addresses given to the RAM shown in FIG. 5.

FIG. 6 illustrates an example of an address table for storing addresses given to the RAM 44 shown in FIG. 5.

The address table is provided with address storage fields, AD1, AD2, AD3 and AD4, at every area of 47, 48, 49 and 50. An address, which can be written into the address storage fields, AD1, AD2, AD3 and AD4, is decided according to the storage capacity of areas, 47, 48, 49 and 50, established by the arrangement of the RAM 44.

Returning to FIG. 4, the HDD 45 is a readable/writable non-volatile memory. The HDD 45 stores a personal computer identifying information storage section 51, a concentration correction program 52, a registration program 53, a browser preparing program 54 and a rebooting control program 55.

The personal computer identifying information storage section 51 stores identification information individually given to the personal computer 2 for identifying the personal computer 2 connected via the network 3 to the printer 1.

The concentration correction program 52 corrects the concentration of an image formed on the recording paper 4.

The registration program 53 executes registration.

The browser preparing program 54 prepares a browser according to the instructions of a user and sends the thus prepared browser to the personal computer 2.

The rebooting control program 55 controls the execution of rebooting on receiving of rebooting commands.

The network IF 46 inputs and outputs data with the network 3. Further, the printer 1 may be provided with a parallel IF, a USB IF and the like, in addition to the network IF 46, and configured to connect to an external apparatus such as the personal computer 2 via interfaces thereof.

Description will be made of operation of the above constituted printer 1.

The printer 1 stores in the receiving buffer 47 print data received from the personal computer 2 via the network 3, thereby developing the data as page data on the RAM 44. The paper feeding portion 21 picks up recording paper 4 from the paper feeding cassette 12 and conveys it to an image forming portion 22. The image forming portion 22 charges uniformly a photosensitive drum 27 of an image forming unit 24 by using an electrifier 28 to radiate light from an exposure unit 29 on the surface of the photosensitive drum 27, thereby forming an electrostatic latent image. Application of development bias voltage to the development unit 30 allows toner to adhere to the photosensitive drum 27, thereby making visible the electrostatic latent image on the photosensitive drum 27. The visible image on the photosensitive drum 27 is transferred to the recording paper 4 between the photosensitive drum 27 and the transfer roller 31. The image transferred to the recording paper 4 is heat-fixed at the fixing portion 26. Thus, the recording paper 4 on which the image is formed is discharged from the paper discharging portion 23 to the paper discharging tray 13.

In this instance, toner is adhered to the surface of the photosensitive drum 27 by development bias voltage. Therefore, a quantity of the adhered toner changes depending on the magnitude of the development bias voltage, and the concentration of an image formed on the recording paper 4 changes accordingly. Thus, the printer 1 executes a concentration correction program 52 at the same time when the power-on switch 17 is turned on to activate the power supply 39, thereby carrying out concentration correction.

The concentration correction will be carried out as follows.

The control portion 40 which has counted the number of times at which an image is formed will renew the development bias voltage at the time of patch formation when the image is formed at a predetermined number of times, thereafter, a conveyance belt driving roller 33 is driven to move a conveyance belt 32 and also an image forming unit 24, thereby forming a patch on the conveyance belt 32. The patch formed on the conveyance belt 32 is measured for concentration by a concentration sensor 37. Then, a difference is obtained between the concentration measured by the concentration sensor 37 and a predetermined target concentration, and a correction quantity of the development bias voltage is calculated so that the difference can be made zero, thereby correcting the development bias voltage. Therefore, the above-described concentration correction is able to make the concentration constant after an image is formed several times on the condition that an electrifier 28 is constant in charging performance.

Further, when the conveyance belt 32 is used to convey recording paper 4 to image forming units, 24Y, 24M, 24C and 24K, the printer 1 sequentially transfers toner of each color CMYK (cyan, magenta, yellow and black) from the respective photosensitive drums 27 to the recording paper 4, reproducing color at the same time in combination with the toner of the respective colors to effect color printing. This color printing based on a tandem system uses image forming units 20Y, 20M, 20C and 20K at different positions to form an image consisting of the respective colors, which may pose a problem that a printed position is deviated slightly depending on color, that is, color shift, unless the paper feeding and the printing timing are exactly controlled. Therefore, the printer 1 will execute the registration program 53 at the same time when the power supply is activated, thereby superimposing the respective colors accurately to carry out registration.

The registration will be carried out as follows.

The printer 1 forms a registration mark on the conveyance belt 32, in addition to an image formed on recording paper 4. This registration mark is formed so that each of the image forming units, 24Y, 24M, 24C and 24K, is provided at constant intervals. The registration mark is read by a mark detector 38 to measure a color shift. When the color shift is detected by the mark detector, an exposure unit 29 is corrected and adjusted for its position and orientation by feedback control. Therefore, the above registration makes it possible to prevent the color shift and form a desirable image.

Since the toner used in the concentration correction and the registration is collected by the toner collecting unit 37, the toner will not splash inside the main body casing 11.

Incidentally, a user sometimes finds a case where he or she wants to add, change or delete hardware or a program stored in the printer 1 for the purpose of using the printer 1 more conveniently. More specifically, in order to improve the printing capacity of the printer 1, the printer 1 is accessed by one of the computer 2 under an agreement with users who share the printer 1, thereby, a RAM 44 is changed in arrangement in such a way that storage capacity can be decreased in the case of a free area 49' in FIG. 5 or the storage capacity can be increased in the case of a receiving buffer 47'.

The RAM 44 is changed in arrangement as follows.

Figure 8:
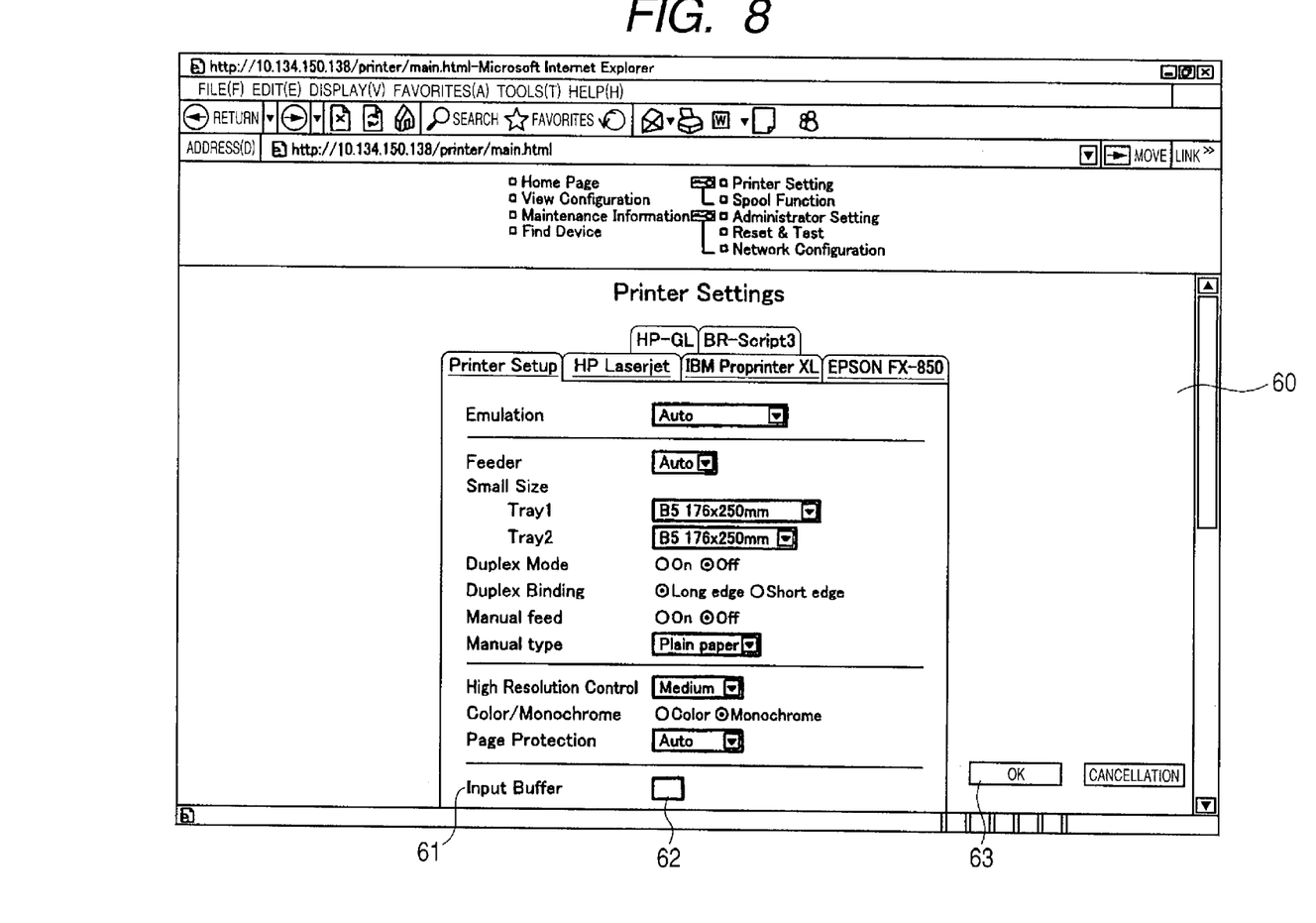
FIG. 8 is a view illustrating one example of the web browser screen displayed on a personal computer shown in FIG. 1.

For example, where a user inputs to a personal computer 2A instructions for changing the arrangement of the RAM 44 so that the control portion 40 of the printer 1 can be accessed via a network 3 from the personal computer 2A, the printer 1 will execute a browser preparing program 54. Then, the identification information of the personal computer 2A is referred to personal computer identifying information storage section 51 for authorization. When the personal computer 2A is confirmed to have legitimate authorization, display data for displaying a web browser 60 as illustrated in FIG. 8 on the personal computer 2A is prepared in an HTML format and sent to the personal computer 2A. A setting item for changing the arrangement of RAM area, "Input Buffer" 61, is provided on the screen of the web browser 60 displayed on the display of the personal computer 2A and illustrated in FIG. 8. Then, the user inputs a set value after the change to a set value input field 62 of the setting item of "Input Buffer" 61, and thereafter clicks an OK button 63. Then, rebooting commands for executing rebooting at the time of changing the arrangement of the RAM 44 are sent from the personal computer 2A to the printer 1, together with commands for changing the arrangement of the RAM 44 on the basis of the set value input into the set value input field 62. When the printer 1 receives the commands for changing the arrangement of the RAM 44 and the rebooting commands to store them in a receiving buffer 47, it will change the arrangement of the RAM 44 according to the commands for changing the arrangement of the RAM 44. In this instance, the rebooting is executed to update the arrangement of the RAM 44.

The web browser 60 given in FIG. 8 displays a rebooting-associated setting item and a rebooting-unassociated setting item on the same screen. However, it may display only the rebooting-associated setting item on one screen, thereby allowing a user to be aware of outputting rebooting commands. The user is accordingly able to be aware of the rebooting. Further, the setting item and the rebooting commands may be set on a separate setting screen so that they can be sent to the printer 1. Accordingly, the rebooting can be carried out at the timing that the user intends.

Further, the rebooting can be carried out not only by using the above-described network-type management function but also on the basis of direct instructions by which the operation button 15 on the printer 1 is operated.

Rebooting halts operation of a hardware resource or a program of the printer 1, thereby initializing the hardware resource or the program. Therefore, there is a case where the printer 1 should not be subjected to rebooting even if rebooting commands are accepted in the course of automatic adjustment processing handling toner, data or the like. In this instance, the printer 1 executes a rebooting control program 55 after activation of the power supply, thereby controlling the execution of the rebooting on input of the rebooting commands.

Figure 7:
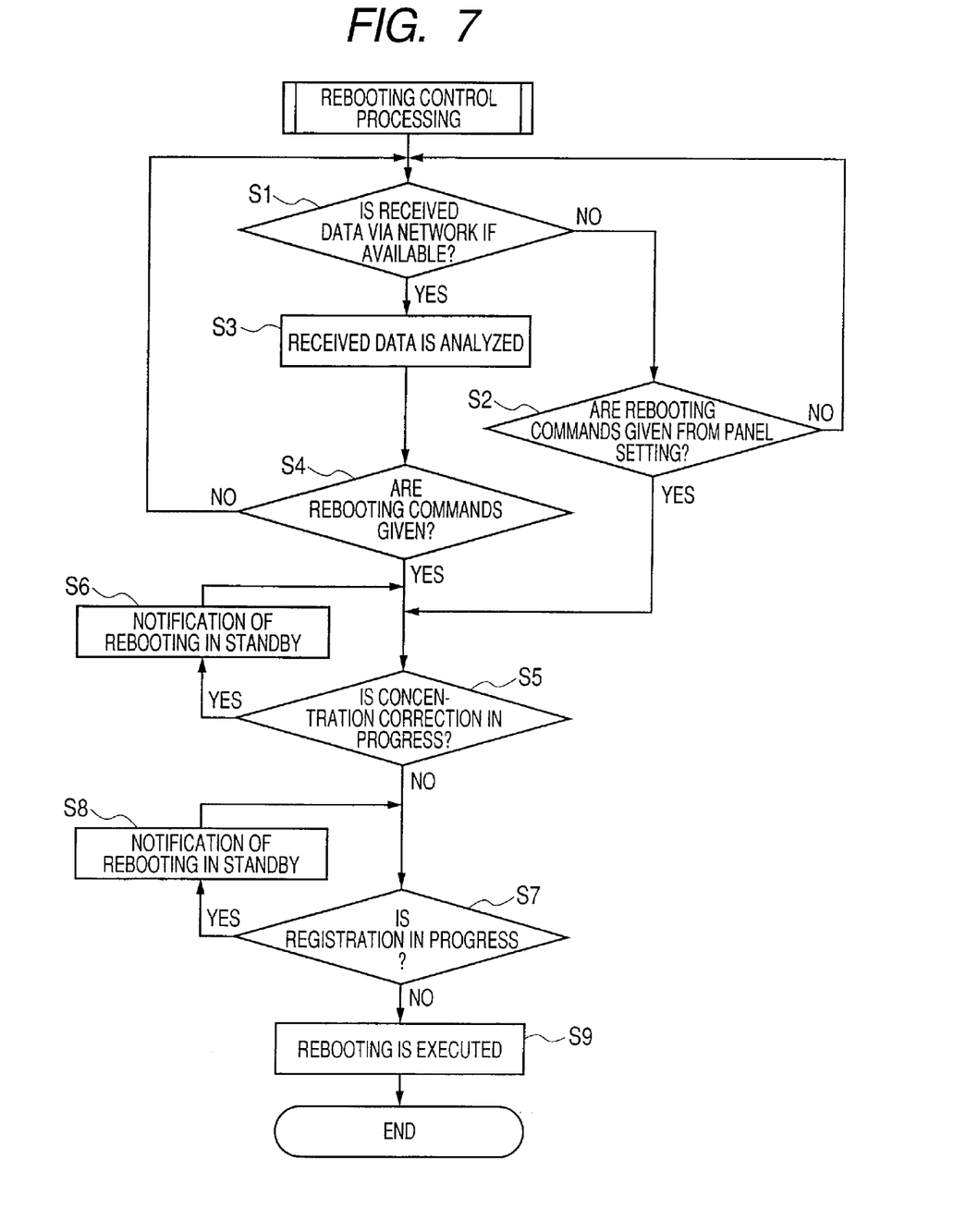
FIG. 7 is a flowchart of a rebooting control program shown in FIG. 4.

FIG. 7 is a flowchart illustrating the rebooting control program 55 given in FIG. 4.

Rebooting control processing judges the availability of data received via a network IF 46 first in Step 1 (hereinafter, abbreviated as "S1") on the basis of received data stored in a receiving buffer 47. Where no data received via the network IF 46 is available (S1: NO), a search is made in S2 on whether the received data stored in the receiving buffer 47 are rebooting commands input from the operation button 15, and a judgment is made as to whether the rebooting commands have been given from the panel setting.

Where a judgment is made that the received data in the receiving buffer 47 are not the rebooting commands input from the operation button 15 and that no rebooting commands are given from the panel setting (S2: NO), no rebooting is required, and therefore, the operation is returned to S1 and kept in standby.

On the other hand, where the received data in the receiving buffer 47 are rebooting commands input from the operation button 15 and a judgment is made that rebooting commands are given from the panel setting (S2: YES), the rebooting is required, and therefore, the operation proceeds to S5.

In contrast, where a judgment is made that received data via the network IF 46 is available in the receiving butter 47 (S1: YES), the received data is analyzed in S3. Then, a judgment is made in S4 as to whether the received data are rebooting commands.

Where received data are not rebooting commands (S4: NO), no rebooting is required, and therefore, the operation is returned to S1 and kept in standby.

On the other hand, where the received data are the rebooting commands (S4: YES), the rebooting is required, and therefore, the operation proceeds to S5.

The processing of S1 to S4 is carried out for confirming whether the rebooting is required by monitoring the received data stored in the receiving buffer 47. In particular, rebooting commands input from the operation button 15 are monitored in the processing of S2, and rebooting commands input from the personal computer 2 are monitored in the processing of S4.

Then, a judgment is made in S5 whether concentration correction is in progress. Whether the concentration correction is in progress is judged on the basis of the formation of a patch by an image forming unit 24 on execution of the concentration correction program 52. Where a patch is formed by the image forming unit 24, the printer 1 makes a judgment that the concentration correction is in progress (S5: YES), sending mail or a confirmation message indicating "rebooting is in standby due to concentration correction now in progress" to the personal computer 2 which has output rebooting commands. Thereby, a user is notified of a fact that the printer 1 is now in a state of rebooting in standby. In this instance, the printer 1 may also display "rebooting is in standby due to is concentration correction now in progress" or the like, for example, on the liquid crystal panel 16, by which the user is notified of a fact that the printer is now in a state of rebooting in standby.

The above-described processing of S5 monitors a state of the image forming unit 24, which is a hardware resource of the printer 1, and that of the concentration correction program 52, which is a program of the printer 1. Thereby, the processing of S5 corresponds to "a monitoring section." Further, the processing of S6 notifies a fact that rebooting is in standby, which corresponds to "a notification section." The processing of S5 and S6 is carried out in order not to execute the rebooting, irrespective of the input of rebooting commands, while the concentration correction program 52 is executed and an image concentration is in automatic adjustment processing.

On the other hand, where a patch is not formed by the image forming unit 24, a judgment is made that concentration correction is not in progress (S5: NO), and a judgment is made in S7 as to whether registration is in progress. Whether the registration is in progress is judged on the basis of a fact that a mark is formed by the image forming unit 24 on execution of the registration program 53. Where the registration program 53 is executed and the mark is formed by the image forming unit 24, a judgment is made that the registration is in progress (S7: YES), and a fact that rebooting is in standby is notified in S8. Since the notification of rebooting in standby is sent similarly as performed in the case that the concentration correction is in progress, the description will be omitted here.

The processing of S7 monitors a state of the image forming unit 24, which is a hardware resource, and that of the registration program 53, which is a program. Therefore, the processing of S7 corresponds to "a monitoring section." Further, the processing of S8 notifies a fact that rebooting is in standby, which corresponds to "a notification section." The processing of S7 and S8 is carried out in order not to execute the rebooting, irrespective of the input of rebooting commands, while the registration program 53 is executed and a color shift is in automatic adjustment processing.

When the printer 1 confirms that the concentration correction or the registration is not executed (S5: NO, S7: NO), it will execute rebooting in S9. In other words, when the printer 1 accepts rebooting commands from the personal computer 2 or the operation button 15 (refer to S1: YES, S3, S4: YES or S1: NO, S2: YES) in a state of detecting that an image concentration and a color shift are in automatic adjustment processing (refer to S5: YES or S7: YES), the printer 1 will execute the rebooting after completion of the automatic adjustment processing. When the printer 1 accepts the rebooting commands from the personal computer 2 or the operation button 15 (refer to S1: YES, S3, S4: YES or S1: NO, S2: YES) in a state that the image forming unit 24 or the registration program 53 is detected not to be in automatic adjustment processing (refer to S5: NO and S7: NO), the printer 1 will immediately execute the rebooting. Therefore, the processings of S2, S4, S5, S7 and S8 correspond to "a rebooting execution section."

Even when the printer 1 of the present aspect accepts rebooting commands for rebooting a hardware resource and a program from the network IF 46 or the operation button 15 (refer to S1: YES, S3, S4: YES or S1: NO, S2: YES in FIG. 7) in a state that the control portion 40 detects a hardware resource such as the image forming unit 24 and a programs such as the concentration correction program 52 or the registration program 53 that are in automatic adjustment processing (refer to S5: YES or S7: YES), the printer 1 will reboot the hardware resource and the program only after completion of the automatic adjustment processing (refer to S5: NO or S7: NO in FIG. 7). It is therefore not necessary to reboot while concentration correction or registration is in progress or resume the concentration correction or registration after completion of the rebooting. For this reason, the printer 1 of the present aspect is able to save toner and time used in concentration correction or registration before the rebooting and therefore is able to avoid wasting toner and time in association with the rebooting.

Further, according to the printer 1 of the present aspect, since the printer displays rebooting in standby on the personal computer 2 or the liquid crystal panel 16 to notify the fact on receiving of rebooting commands from the personal computer 2 or the operation button 15, while concentration correction or registration is in progress (refer to S5: YES, S6 or S7: YES, S8 in FIG. 7), a user will not be erroneously aware of a failure even if the rebooting commands are not executed after the acceptance of the rebooting commands. In particular, if a user is notified of a fact that rebooting is in standby because the concentration correction or the registration is in progress at the time of notifying the rebooting, the user is able to understand an operating state of the printer 1 and keep the rebooting in standby even in a case where it is uncertain whether an external processing such as concentration correction or registration is executed.

Still further, according to the printer 1 of the present aspect, there is no possibility that rebooting is executed while concentration correction is in progress (refer to S5: YES in FIG. 7), thus making it possible to save toner used in forming a patch before the rebooting.

In addition, according to the printer 1 of the present aspect, there is no possibility that rebooting is executed while registration is in progress (refer to S7: YES in FIG. 7). In other words, it is not necessary to resume the registration processing from the beginning after execution of the rebooting, or it will not unnecessarily take a long time to return to an image formable state.

Next, description will be made of a second aspect of the image forming apparatus in the present invention by referring to the drawings.

A printer 1A, which is the image forming apparatus in the second aspect, is different in configuration of a rebooting control program 552 from the rebooting control program 55 of the first aspect (refer to FIG. 4, FIG. 7 and FIG. 9) but similar in other constitutions to the first aspect. Then, description will be made here mainly of the rebooting processing which is different from that of the first aspect, and the same symbols are given to constitutions and processings common to those of the first aspect to omit a description, whenever necessary.

Figure 9:
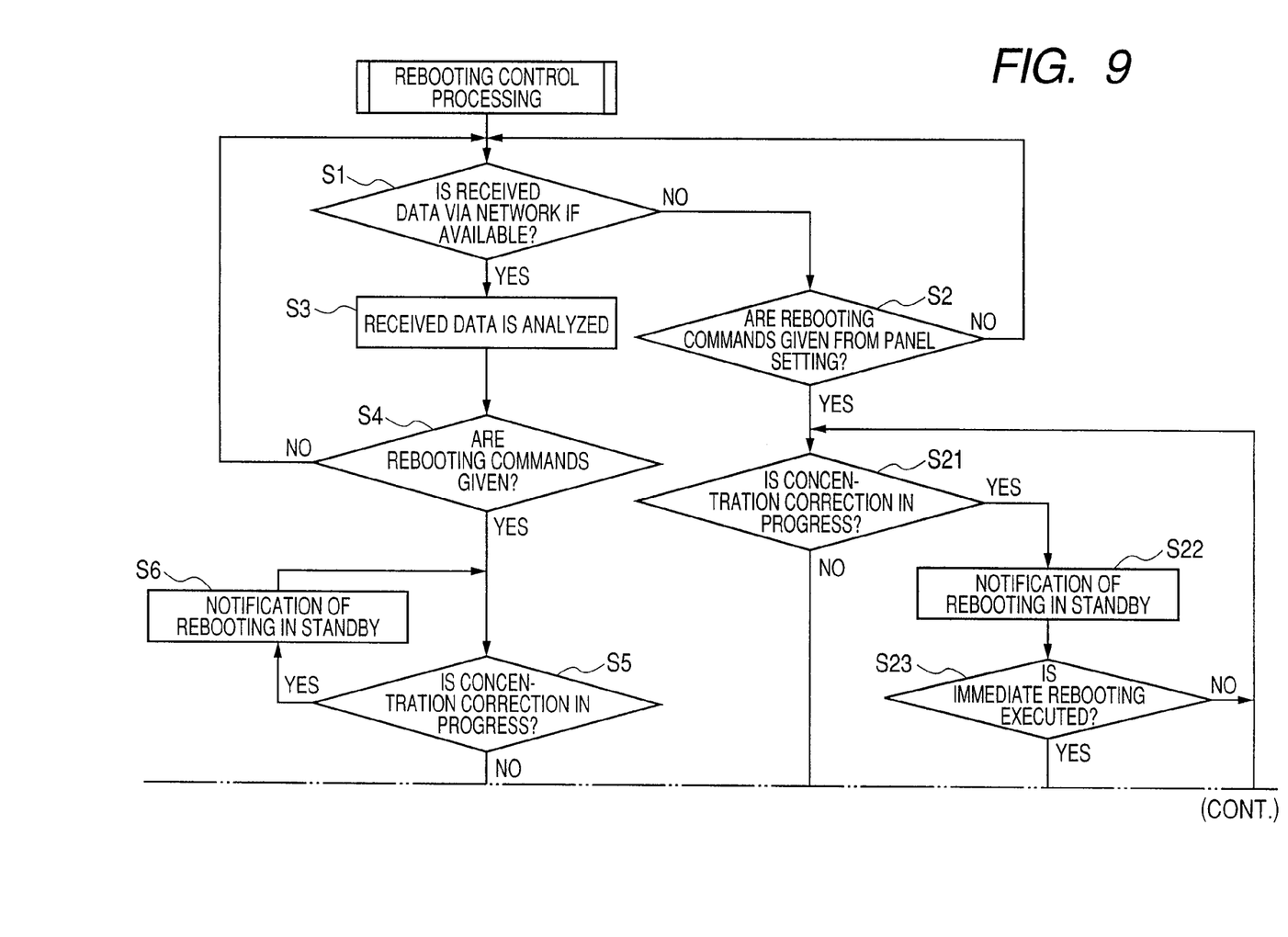
FIG. 9 is a flowchart of a rebooting control program stored in a printer of another exemplary aspect of the present invention.

FIG. 9 is a flowchart illustrating the rebooting control program 552 stored in the printer 1A of the second aspect in the present invention.

The rebooting control processing of the present aspect is different from that of the first aspect in that whether rebooting is executed forcibly or the rebooting is in standby on receiving of rebooting commands from the setting panel is dependent on selection by a user. Therefore, in this instance, a description will be given of S21 to S26 in FIG. 9.

Where received data is not received via a network IF 46 at a receiving buffer 47 (S1: NO) but a an operation button 15 is used to input rebooting commands (S2: YES), a judgment is made in S21 whether concentration correction is in progress. This judgment is made similarly as described previously in S5, a description of which will therefore be omitted here.

Where a judgment is made that the concentration correction is in progress (S21: YES), a fact that rebooting is in standby is displayed on a liquid crystal panel 16 in S22 to notify a user of the fact. In this instance, a message indicating "Is immediate rebooting executed?" or the like is displayed on the liquid crystal panel 16, by which the user is requested to make a decision about whether the rebooting is executed after completion of concentration correction or during concentration correction. This is because, for example, where the user is seated away from the position at which the printer 1 is placed or the user needs to carry out a printing operation in a hurry, he or she may desire to execute the rebooting although the concentration correction is in progress.

Here, in the processing of S21, a judgment is made whether a program or a hardware resource is in automatic adjustment processing by referring to whether a correction program 52 is executed, whether an image forming unit 24 is in operation or the like. Thus, the processing of S21 corresponds to "a monitoring section." Further, the processing of S22 notifies a fact that rebooting is in standby, which corresponds to "a notification section."

Where a user inputs commands that no immediate rebooting is executed (S23: NO) by using an operation button 15, the operation returns to S21 and waits until completion of concentration correction.

On the other hand, where a user inputs commands that an immediate rebooting is executed by using the operation button 15 (S23: YES), the operation proceeds to S9 and terminates the processing by executing the rebooting before completion of the concentration correction.

In this instance, a user is given a chance of selecting whether the rebooting is executed before or after the concentration correction by the processing of S23. Thus, the processing of S23 corresponds to "a selection section." Then, since the rebooting is executed depending on the selection in S23, processings of S21, S23 and S9 correspond to "a rebooting execution section."

In contrast, where a judgment is made that the concentration correction is not in progress (S22: NO), a judgment is made in S24 whether the registration is progress. A judgment on whether the registration is in progress is made similarly as in S7, and the description will be omitted here.

Where a judgment is made that the registration is not in progress (S24: NO), the rebooting is executed as it is in S9 since automatic adjustment processing such as concentration correction or registration is not carried out.

On the other hand, where a judgment is made that the registration is in progress (S24: YES), a notification of the rebooting in standby is sent in S25. This notification is similar to that sent in S22, and the description will be omitted here. Then, a judgment is made in S26 whether the rebooting is executed immediately.

Where a user inputs commands that an immediate rebooting is executed by using an operation button 15, the registration is discontinued in S9, and the rebooting is executed to terminate the processing.

On the other hand, where the user inputs commands that an immediate rebooting is not executed by using the operation button 15, the operation returns to S21 and waits until the registration is completed. Then, after completion of the registration, the rebooting is executed in S9 to terminate the processing.

In this instance, a user is given a chance of selecting whether the rebooting is executed before or after completion of the registration by the processing of S26. Therefore, the processing of S26 corresponds to "a selection section." Since the rebooting is executed depending on the selection in S26, processings of S24, S26 and S9 correspond to "a rebooting execution section."

Therefore, when rebooting commands are input (refer to S1: YES, S2, S3: YES or S1: NO, S2: YES in FIG. 9) in a state that the control portion 40 detects that the concentration correction or registration is in progress (refer to S21: YES or S24: YES in FIG. 9), the printer 1A of the present aspect judges whether the rebooting commands are input from the printer 2 via the network 3 to the receiving buffer 47 or input to the operation button 15. When the rebooting commands are judged to have been input to the operation button 15 (refer to S2: YES in FIG. 9), a user is allowed to select whether rebooting is executed after concentration correction or registration processing is completed or rebooting is executed before the concentration correction processing or the registration processing is completed, and the rebooting is executed depending on the selection result (refer to S21 to S26 in FIG. 9). Therefore, the printer 1 of the present aspect is able to not only avoid wasting toner used in forming a patch or a registration mark before the concentration correction and time necessary for resuming the registration from the beginning after completion of the rebooting but also execute the rebooting at any time when so intended by the user.

Further, a description will be given of a third aspect of the image forming apparatus in the present invention by referring to the drawings.

A printer 1B, which is the image forming apparatus of the third aspect is different in configuration of a rebooting control program 553 from the rebooting control program 55 of the first aspect (refer to FIG. 4, FIG. 7 and FIG. 10) but similar in other constitutions to those of the first aspect. Then, description will be given here mainly of the rebooting processing which is different from that of the first aspect, and the same symbols are given to constitutions and processings common to those of the first aspect to omit a description, whenever necessary.

Figure 10:
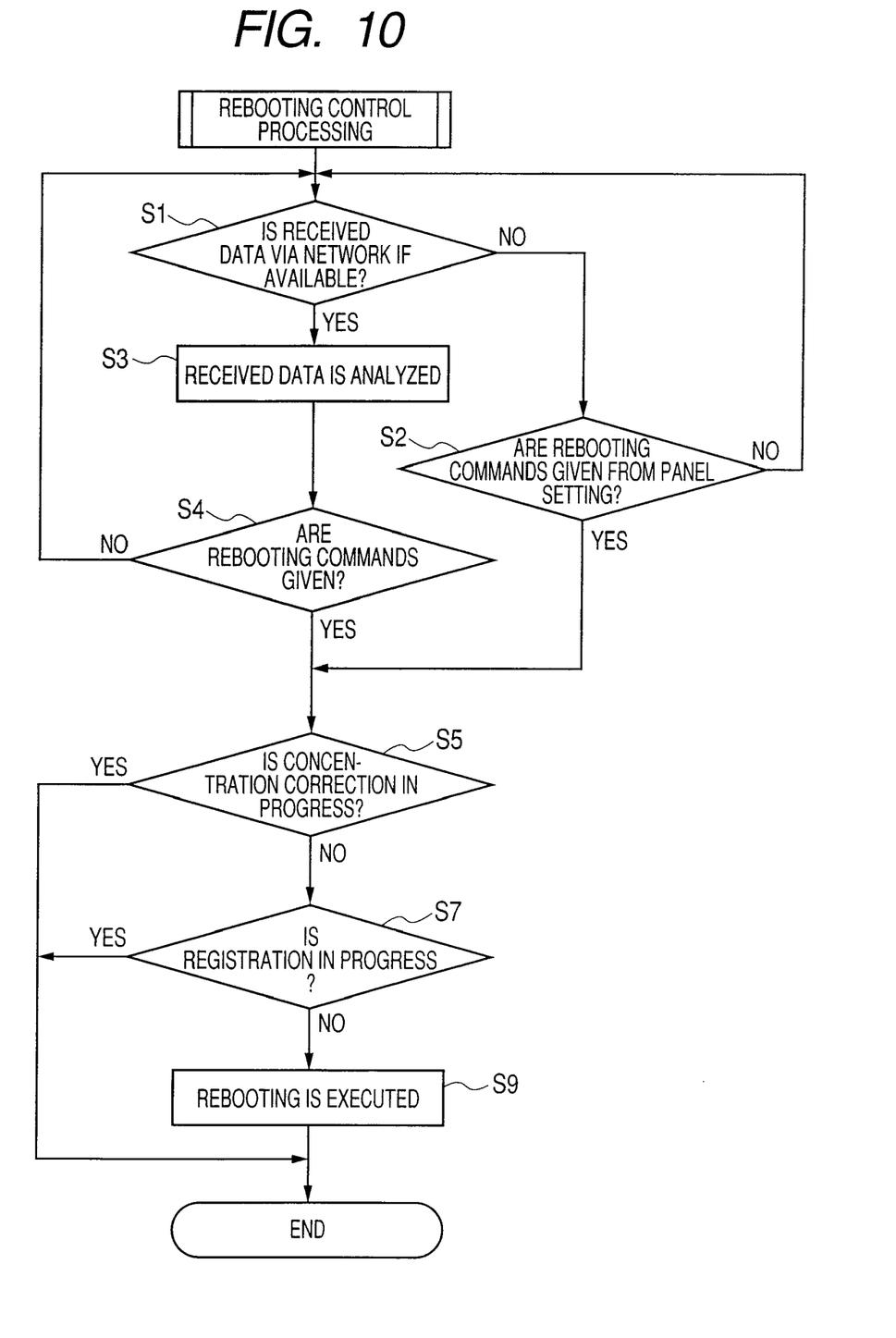
FIG. 10 is a flowchart illustrating the rebooting control program stored in a printer a further exemplary aspect of the present invention.

FIG. 10 is a flowchart illustrating the rebooting control program 553 stored in the printer 1B of the third aspect in the present invention.

In the rebooting control processing of the third aspect, when rebooting commands are received from the personal computer 2 or the operation button 15 (refer to S1: YES, S2, S3: YES or S1: NO, S2: YES), the printer 1 which is in concentration correction (S5: YES) gives priority to the concentration correction and ignores the rebooting commands. In other words, the printer will terminate the processing without executing the rebooting.

Further, when rebooting commands are received from the personal computer 2 or the operation button 15 (refer to S1: YES, S2, S3: YES or S1: NO, S2: YES), the printer 1 which is in registration (S7: YES) gives priority to the registration processing and ignores the rebooting commands. In other words, the printer will terminate the processing without executing the rebooting.

As described so far, where the printer 1 automatically adjusts an image concentration or a color shift in the processings of S5 and S7, rebooting commands are made nonexecutable. Therefore, S5 and S7 correspond to "a non-execution section."

Therefore, even when the receiving buffer 47 accepts rebooting commands in a state that the control portion 40 detects that the concentration correction or the registration is executed, the printer 1B of the present aspect makes the rebooting commands nonexecutable, ignoring the same (refer to S5: NO, S7: NO in FIG. 10). The rebooting commands may be input either from the personal computer 2 or the operation button 15 (refer to S2: NO, S4: NO in FIG. 10). Therefore, the printer 1B of the present aspect is able to save toner used in processing a patch on concentration correction or forming a registration mark on registration and also avoid wasting time necessary in returning to an image formable state for resuming the registration from the beginning after discontinuation of the registration.

A description has been so far given of the printers 1, 1A and 1B, which are aspects of the present invention. The present invention will not be restricted thereto but may be applicable in various ways.

For example, in the above-described aspect, the printer 1 is exemplified as an image forming apparatus, but a network facsimile, a multifunction printer or a copying machine may be used as an image forming apparatus.

For example, in the above-described aspect, rebooting in standby is notified via the personal computer 2 of a user who sends rebooting commands or the liquid crystal panel 16. However, all personal computers 2 connected to the printer 1 may be notified of a fact that rebooting is in standby. In this instance, the printer 1 is in automatic adjustment processings such as concentration correction or registration and therefore not usable, the fact of which can be known to other users who will not input the rebooting commands.

For example, in the above-described aspect, concentration correction and registration, which are difficult in confirming an operational state outside the printer 1, are exemplified as automatic adjustment processing. However, even automatic adjustment processing which can be easily confirmed for an operational state from outside may be made as a basis for adjusting the timing of executing the rebooting.

What is claimed is:

1. An image forming apparatus, which is connectable to an external apparatus via a network, comprising:
a hardware resource used in image formation; and
a storage unit storing a program for processing the image formation; and
a controller that is operable to perform operations including:
receiving rebooting commands for rebooting the hardware resource and the program from the external apparatus via the network;
inputting the rebooting commands for rebooting the hardware resource and the program;
monitoring a state of the hardware resource and a state of the program and detecting whether at least one of the hardware resource and the program is in automatic adjustment processing;
detecting whether the rebooting commands are received by the receiving or inputted by the inputting, when the rebooting commands are input in a state that the hardware resource or the program is detected in automatic adjustment processing;
selecting whether the rebooting is executed after completion of the automatic adjustment processing or before completion of the automatic adjustment processing, when the rebooting commands are inputted by the inputting; and
executing the rebooting depending on the result of the selecting.

2. The image forming apparatus according to claim 1, wherein the automatic adjustment processing is concentration correction.

3. The image forming apparatus according to claim 1, wherein the automatic adjustment processing is registration processing.

4. A non-transitory computer readable medium having a program for processing image formation using a hardware resource stored thereon which, when executed by a computer, causes the computer to perform predetermined operations comprising:
receiving rebooting commands for rebooting the hardware resource and the program from an external apparatus via a network;
inputting the rebooting commands for rebooting the hardware resource and the program;
monitoring a state of the hardware resource and a state of the program and detecting whether at least one of the hardware resource and the program is in automatic adjustment processing;
detecting whether the rebooting commands are received by the receiving or inputted by the inputting, when the rebooting commands are input in a state that the hardware resource or the program is detected in automatic adjustment processing;
selecting whether the rebooting is executed after completion of the automatic adjustment processing or before completion of the automatic adjustment processing, when the rebooting commands are inputted by the inputting; and
executing the rebooting depending on the result of the selecting.

* * * * *